(12) United States Patent
Yoon (10) Patent No.: US 9,329,680 B2
(45) Date of Patent: May 3, 2016

(54) TERMINAL AND METHOD FOR IRIS SCANNING AND PROXIMITY SENSING

(71) Applicant: Samsung Electronics Co., Ltd., Gyeonggi-do (KR)

(72) Inventor: Sungjin Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 429 days.

(21) Appl. No.: 13/887,670

(22) Filed: May 6, 2013

(65) Prior Publication Data

US 2013/0293457 A1 Nov. 7, 2013

(30) Foreign Application Priority Data

May 4, 2012 (KR) .................. 10-2012-0047311

(51) Int. Cl.
| | |
|---|---|
| *A61B 3/00* | (2006.01) |
| *A61B 3/14* | (2006.01) |
| *G06F 3/01* | (2006.01) |
| *G06K 9/00* | (2006.01) |
| *G06K 9/20* | (2006.01) |

(52) U.S. Cl.
CPC ............. *G06F 3/011* (2013.01); *G06F 3/013* (2013.01); *G06K 9/00604* (2013.01); *G06K 9/2018* (2013.01)

(58) Field of Classification Search
USPC .................................. 351/200–246
See application file for complete search history.

(56) References Cited

U.S. PATENT DOCUMENTS

| | | | |
|---|---|---|---|
| 6,333,988 B1 | 12/2001 | Seal et al. | |
| 7,693,307 B2* | 4/2010 | Rieul ............... | G06K 9/00604 340/5.53 |
| 2003/0152252 A1* | 8/2003 | Kondo ............. | G07C 9/00158 382/117 |
| 2003/0156741 A1 | 8/2003 | Lee et al. | |
| 2004/0169817 A1* | 9/2004 | Grotehusmann ..... | A61B 3/152 351/204 |

FOREIGN PATENT DOCUMENTS

KR 10-0673427 B1 11/2006

* cited by examiner

*Primary Examiner* — Mohammed Hasan
(74) *Attorney, Agent, or Firm* — Cha & Reiter, LLC.

(57) ABSTRACT

A method of iris scanning and proximity sensing includes: receiving selection information of an operation mode; sensing an iris including emitting light having an amount of light of a first level, and photographing an iris using the emitted light if a selected operation mode is a iris scanning mode; sensing a proximity including emitting light having an amount of light of a second level, and sensing information on whether an object has approached using the emitted light if the selected operation mode is a proximity sensing mode; and recognizing the iris using the photographed iris image, and performing a function according to the sensed information on whether the object has approached, and the first level has a value higher than the value of the second level.

12 Claims, 11 Drawing Sheets

TERMINAL AND METHOD FOR IRIS SCANNING AND PROXIMITY SENSING

CLAIM OF PRIORITY

This application claims, pursuant to 35 U.S.C. §119(a), priority to and the benefit of the earlier filing date of a Korean patent application filed on May 4, 2012 in the Korean Intellectual Property Office and assigned Serial No. 10-2012-0047311, the entire disclosure of which is hereby incorporated by reference.

BACKGROUND OF THE INVENTION

1. Field of the Invention

The present invention relates to a terminal and method for iris scanning and proximity sensing, and more particularly, to a terminal capable of increasing the iris scanning rate by sharing light emitting illumination needed for proximity sensing and light emitting illumination needed for iris scanning, and a method of iris scanning and proximity sensing.

2. Description of the Related Art

Iris scanning is used to collect information of characteristics of respective attributes of irises of people and use the information in authentication technology for security. The iris has unique patterns whose number is larger than that of the fingerprint. Further, iris scanning is a non-contact type of scanning and authentication, and thus people do not feel uncomfortable with the iris scanning. In addition, a person may be accurately identified even if the person wears eyeglasses or contact lenses. Moreover, iris scanning usually takes less than two seconds, and thus iris scanning is being evaluated as a biometric identification technology more advanced than a fingerprint or retina scanning technology.

Further, as a terminal, such as a portable terminal, a mobile device, a cell phone, or other electronic devices, gets rapidly sophisticated, the amount of information stored in the terminal increases, the importance of information is on the increase, and a security technology applied to the terminal is also getting sophisticated. As described above, iris scanning is a technology more advanced than a fingerprint or retina scanning technology in terms of the accuracy and speed, and scanning without contact is possible using a camera. Hence, if iris scanning is applied to the terminal, the security of the terminal may be more strengthened, and the terminal may provide various services related with authentication to user.

However, despite all such advantages, iris scanning is not being widely applied to terminals in Korea and elsewhere. This is partly because of the costs of iris scanning technology in the prior art, but is also because of the scanning rate problem. In the case of the prior art which applies iris scanning, a terminal uses a flash built in for photographing as illumination for iris scanning. In the case of some people, such as non-Asians, iris scanning is possible only using a general flash as illumination. However, in the case of other people, including Asian people, many Asians do not have sufficient melanin pigments in their eyes, and thus infrared rays need to be stably secured. As a result, an illuminator of infrared rays needs to be separately installed to increase the iris scanning rate. However, having a separate built-in infrared ray illumination for iris scanning would make it difficult for the terminal to be lighter and smaller.

SUMMARY OF THE INVENTION

The present invention has been made in view of the above problems, and an object of the present invention is to provide an apparatus and method for increasing the iris scanning rate using a proximity sensor built into a terminal without installing a separate infrared ray illuminator in the terminal.

Further, another object of the present invention is to provide a terminal and method which provides an illuminator needed for iris sensing, and, at the same time, allows proximity sensing.

In accordance with an aspect of the present invention, a method of iris scanning and proximity sensing includes: an operation of receiving selection information of an operation mode; an iris sensing operation of emitting light having an amount of light of a first level, and photographing an iris using the emitted light if a selected operation mode is a iris scanning mode; a proximity sensing operation of emitting light having an amount of light of a second level, and sensing information on whether an object has approached using the emitted light if the selected operation mode is a proximity sensing mode; a control operation of recognizing the iris using the photographed iris image, and performing a function according to the sensed information on whether the object has approached, wherein the first level has a value higher than the value of the second level.

In accordance with another aspect of the present invention, a terminal for iris scanning and proximity sensing includes: an input unit for receiving selection information of an operation mode; an iris sensing unit for emitting light having an amount of light of a first level, and photographing an iris using the emitted light if a selected operation mode is a iris scanning mode; a proximity sensing unit for emitting light having an amount of light of a second level, and sensing information on whether an object has approached using the emitted light if the selected operation mode is a proximity sensing mode; a controller for recognizing the iris using the photographed iris image, and performing a function according to the sensed information on whether the object has approached, wherein the first level has a value higher than the value of the second level.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Figure 1A:
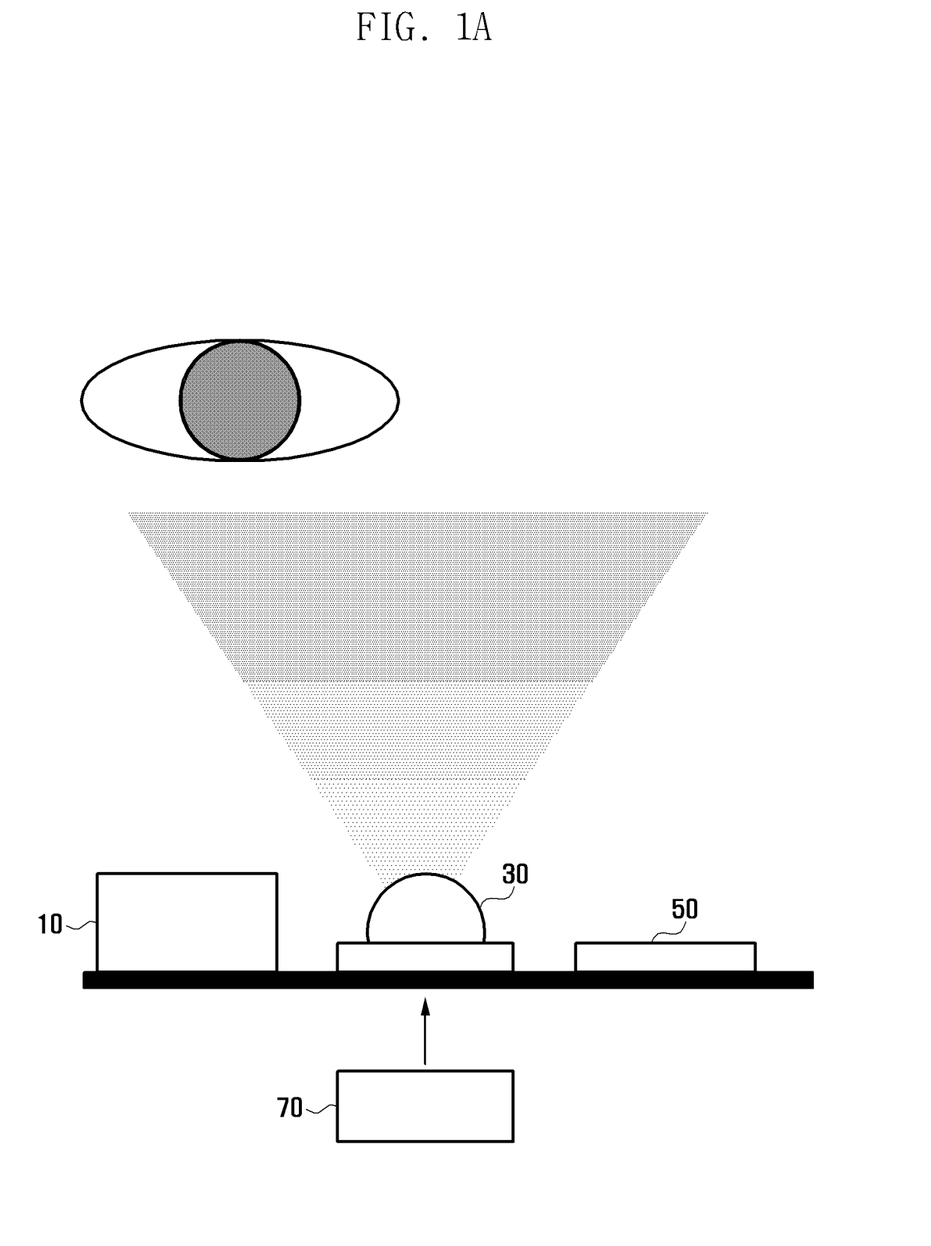
FIG. 1A schematically illustrates a configuration of a terminal according to an exemplary embodiment of the present invention.
Figure 1B:
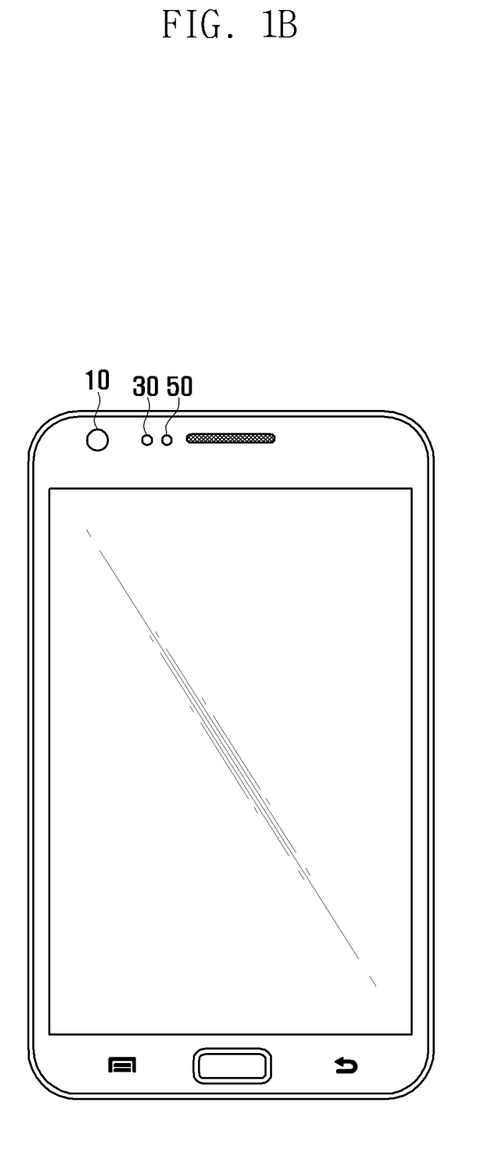
FIG. 1B illustrates an external appearance of the terminal according to the exemplary embodiment of the present invention.

FIG. 1A schematically illustrates a configuration of a terminal according to an exemplary embodiment of the present invention, and FIG. 1B illustrates an external appearance of the terminal according to the exemplary embodiment of the present invention.

Referring to FIGS. 1A and 1B, the terminal according to the exemplary embodiment of the present invention may include a camera 10, a light emitting unit 30, a light receiving unit 50, and a power supply unit 70. The external appearance of the terminal is similar to the terminal including a proximity sensor and a camera according to the prior art, but the present invention further includes the power supply unit 70 for iris scanning. Further, in the exemplary embodiment of the present invention, it is preferred that the light emitting unit 30 is positioned between the camera 10 and the light receiving unit 50, but the present invention is not limited to this example.

Hereinafter, a configuration of the terminal according to the exemplary embodiment of the present invention will be described in detail with reference to FIG. 2.

Figure 2:
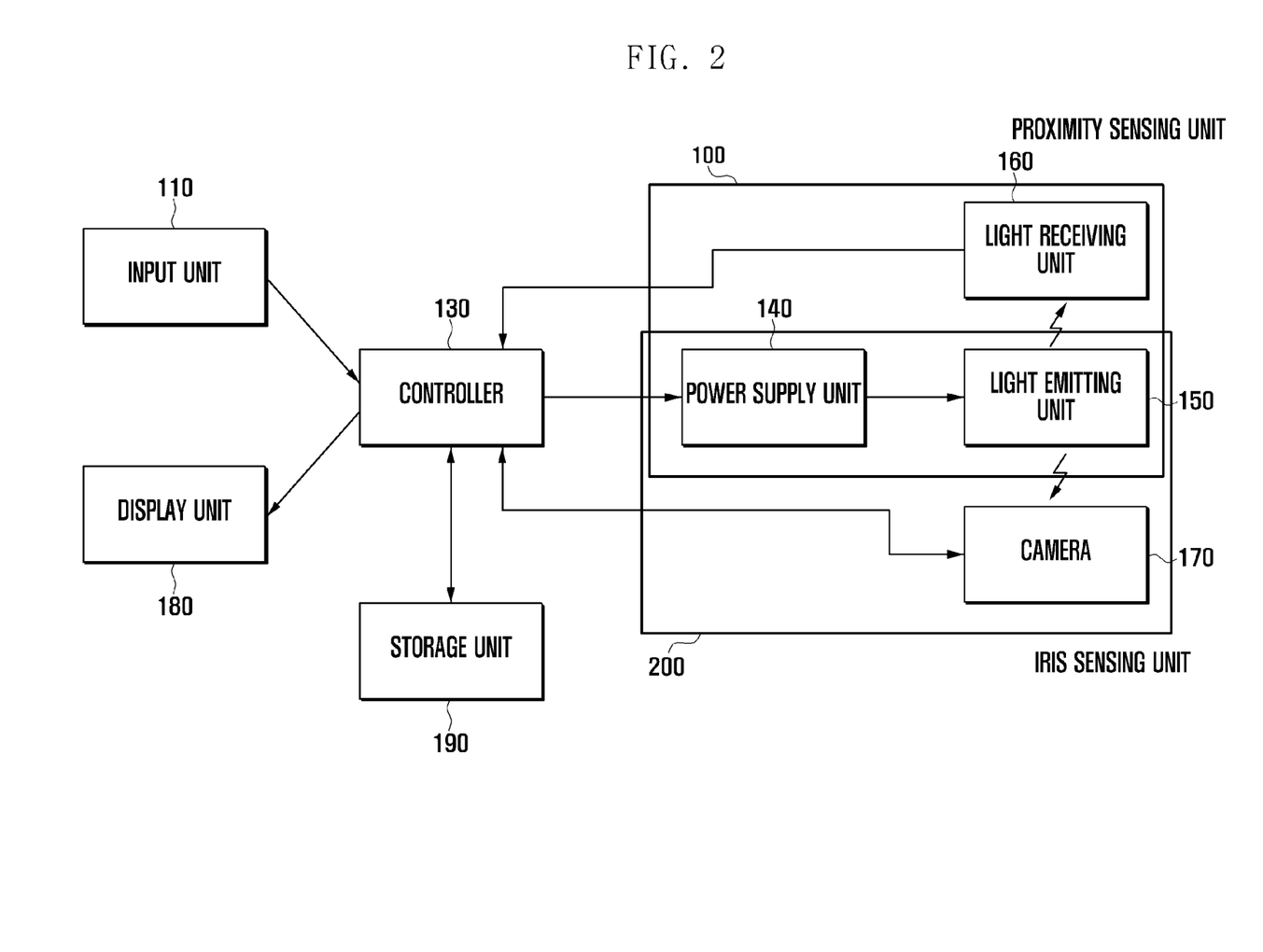
FIG. 2 is a block diagram illustrating a configuration of the terminal according to the exemplary embodiment of the present invention.

FIG. 2 is a block diagram illustrating a configuration of the terminal for iris scanning and proximity sensing according to the exemplary embodiment of the present invention. Referring to FIG. 2, the terminal for iris scanning and proximity sensing according to the exemplary embodiment of the present invention may include an input unit 110 for receiving an input of selection information of the operation mode from a user, a controller 130 for controlling iris sensing and proximity sensing, a proximity sensing unit 100 for sensing whether an object has approached, and an iris sensing unit 200 for photographing an iris, and may further include a display unit 180 for displaying feedback information and a storage unit 190 for storing information needed for iris scanning, and data needed for iris scanning and proximity sensing. Specifically, the proximity sensing unit 100 according to the exemplary embodiment of the present invention may include a power supply unit 140, a light emitting unit 150 and a light receiving unit 160, and the iris sensing unit 200 according to the exemplary embodiment of the present invention may also include the power supply unit 140 and the light emitting unit 150 as well as a camera 170. As illustrated in FIG. 2, the proximity sensing unit 100 and the iris sensing unit 200 according to the exemplary embodiment of the present invention share one or more modules, such as the power supply unit 140 and the light emitting unit 150, but perform different functions. Further, the proximity sensing unit 100 and the iris sensing unit 200 may be separately operated according to the selection information, and may be simultaneously operated according to a need and/or a selection for simultaneous operations.

The input unit 110 receives selection information of the operation mode. The iris scanning mode and the proximity sensing mode may be included in the operation mode, and the proximity sensing mode may be set as a default value. The proximity sensing mode is set as the default mode because the proximity sensing mode is used in general operations of the terminal, and the amount of light required for the proximity sensing is less than the amount of light required for iris scanning. The input unit 110 may be a soft button, a virtual button, and/or an icon of a touch pad or touch screen, a keyboard, a microphone, or a sensor for sensing an action or a gesture. If selection information is inputted by a voice through a microphone or selection information is inputted by an action or a gesture through a sensor, the terminal may further include a module for analyzing the selection information inputted by a voice, an action or a gesture, and transmitting the information to the controller 130. The module used as the input unit 110 is not limited to the above described example, and the input of the selection information is also possible by a combination of any of the components in the exemplary embodiment of the present invention.

If the selected operation mode is an iris scanning mode, the iris sensing unit 200 emits light having an amount of light of a first level, such as a first intensity level, and photographs the iris using the emitted light. On the other hand, if the selection operation mode is a proximity sensing mode, the proximity sensing unit 100 emits light having an amount of light of a second level, such as a second intensity level, and senses whether an object has approached using the emitted light. Further, the controller 130 senses the iris using the photographed iris image, or performs a corresponding function according to whether the object has approached. At this time, the first level has a light amount value higher than the light amount value of the second level because the iris scanning requires an amount of light greater than the amount of light in the proximity sensing. The light having the amount of light of the first level emitted in the iris scanning mode and the light having the amount of light of the second level emitted in the proximity sensing mode may be emitted by one module. That is, the iris sensing unit 200 and the proximity sensing unit 100 may share the module for emitting light and/or may be implemented by a single component.

Hereinafter, it will be described how each component included in the proximity sensing unit 100 and the iris scanning unit 200 is operated in each operation mode by the modules. It should be noted that the proximity sensing unit 100 and the iris sensing unit 200 may share some modules as explained above.

In the iris scanning mode, the power supply unit 140 supplies power, corresponding to the amount of light of the first level, to the light emitting unit 150 for emitting light, and in the proximity sensing mode, the power supply unit 140 supplies power, corresponding to the amount of light of the second level, to the light emitting unit 150 for emitting light. If the input unit 110 receives an input of the selection information of the operation mode, the controller 130 may receive the information, determine the power to be supplied to the light emitting unit 150 in each mode, and transmit a power control signal to the power supply unit 140. If the power control signal is received, the power supply unit 140 may supply power to the light emitting unit 150 according to the power control signal. As described above, the first level, which is the amount of light emitted in the iris scanning mode, is higher than the second level, which is the amount of light emitted in the proximity sensing mode, and the first and second level values may be changed according to a control signal from the controller 130 to the light emitting unit 150, with the control signal generated from a user selection received through the input unit 110, or generated from light level values previously stored in the storage unit 190.

The light emitting unit 150 emits light using power supplied by the power supply unit 140. That is, in the iris scanning mode, the light having the amount of the first level is emitted, while in the proximity sensing mode, the light having the amount of the second level is emitted. The light emitted by the light emitting unit 150 may be infrared rays, and the light emitting unit 150 may be a light emitting diode (LED) or an organic light emitting diode (OLED). Any device capable of emitting infrared rays may be used as the light emitting unit 150, and the present invention is not limited to the above described exemplary embodiment. The light emitting unit 150 emits light having a relatively large amount of light in the iris scanning mode compared to the proximity sensing mode. For example, with light levels measured on a scale of 1 to 10, if the light emitting unit 150 emits light having the amount of light of level 1 in the proximity sensing mode, the light emitting unit 150 may emit light having the amount of light of level 10 in the iris scanning mode. Further, the light emitting unit 150 may be disposed between the camera 170 and the light receiving unit 160, as shown in FIG. 1A for the corresponding camera 10, the light emitting unit 30, and the light receiving unit 50. That is, it is possible for the proximity sensing unit 100 and/or the controller 130 to recognize and/or measure the distance between the terminal and the iris with a small error by allowing the emitted light to be radiated near the gazing iris, and the position of the terminal and/or the module implementing the light emitting units 30, 150 may be physically regulated and orientated so that the emitted light is sufficiently directed on the iris.

The camera 170 photographs an iris lighted up by the light emitted from the light emitting unit 150. The camera 170 may transmit the photographed iris image to the controller 130. In case the iris scanning and proximity sensing are performed together in the iris scanning mode, the camera 170 may automatically photograph the iris from a certain distance. In other words, the camera 170 may be set to automatically photograph the user's iris when the difference between the distance recognized in the controller 130 and the optimal distance for iris scanning is within a preset range of allowable deviation from the optimal distance. The optimal distance may be a predetermined distance, and the optimal distance and the preset range may be stored in the storage unit 190, or may be selected or set by the user using the input unit 110.

The controller 130 sets a light reception analysis level to correspond to the amount of light of the first level when operating in the iris scanning mode, and alternatively sets the light reception analysis level to correspond to the amount of light of the second level when operating in the proximity sensing mode. The light reception analysis level is a criterion value for determining whether an object has approached. That is, proximity sensing may be possible even in the iris scanning mode, and because the amount of light emitted in the iris scanning mode is different from the amount of light emitted in the proximity sensing mode, the light reception analysis level for analyzing the light, which reflects off an object and is collected, has different values in each mode. The light reception analysis level may be a predetermined value which is also stored in the storage unit 190, or may be selected or set by the user using the input unit 110. The controller 130 may transmit a power control signal to the power supply unit 140 so that the power supply unit 140 may supply power corresponding to the amount of light of each level in the iris scanning mode or proximity sensing mode. Further, the power control signal is transmitted to the power supply unit 140, and at the same time, the light reception analysis level corresponding to the amount of light of each level may be set and may be transmitted to the light receiving unit 160. In this case, the light reception analysis level corresponding to the amount of light corresponding to each level may have been stored in advance in the storage unit 190. In an alternative embodiment, the controller 130 may collect light which reflects off of an outside object, analyze the collected light, and then set the light reception analysis level.

Further, in case the proximity sensing is performed in the iris scanning mode, the controller 130 may compare the recognized distance with the optimal distance for iris scanning, and transmit the feedback information according to the result of the comparison to the display unit 180. Here, the optimal distance for iris scanning may be information stored in advance in the storage unit 190, or information received through a communication network, either through the input unit 110 or a communication interface of the controller 130. If the emitted light reflects off an object, the light receiving unit 160 collects the reflected light, and recognizes the distance with the object using the collected light and the light reception analysis level. The light receiving unit 160 is an element of the proximity sensing unit 100, and is used in sensing whether the object has approached the terminal. The light receiving unit 160 is a module used in the proximity sensing, but the light receiving unit 160 may also be used to search for an appropriate distance for iris scanning even in the iris scanning mode. As described above, the amount of light emitted in each mode is different, and thus the amount of reflected light is also different. Hence, in the iris scanning mode, the light receiving unit 160 receives the light reception analysis level corresponding to the amount of light of the first level from the controller 130, and in the proximity sensing mode, the light receiving unit 160 receives the light reception analysis level corresponding to the amount of light of the second level from the controller 130. The light reception analysis level is a criterion for determining whether an object has approached as described above. The light receiving unit 160 compares the power of the collected light with the light reception analysis level, and determines that an object has approached the terminal in case the collected light has a power higher than the light reception analysis level. Further, in case the collected light has a power lower than the light reception analysis level, the light receiving unit 160 may determine that the object has not approached the terminal 100. As stated above, in the iris scanning mode, the light receiving unit 160 collects light having an amount of light greater than that in the proximity sensing mode. However, in the proximity sensing mode, the controller 130 sets the light reception analysis level higher, and thus the light receiving unit 160 may recognize the distance with the object even if the amount of light collected in each mode is different. Further, in the iris scanning mode, the amount of light is high, and thus the available distance for proximity sensing may be further increased. The relationship between the light emitted by the light emitting unit 150 and received the light receiving unit 160 and the light reception analysis level will be described in detail with reference to FIGS. 3 to 6.

When proximity sensing is performed in the iris scanning mode, the display unit 180 displays the feedback information according to the result of comparison between the distance recognized between an object, such as user's eye and face and the terminal, and the optimal distance for iris scanning. The feedback information may be guide information on whether the distance between the object and the terminal should be farther or closer as a result of the result of the comparison between the recognized distance and the optimal distance. Hence, the user may set the distance between the terminal and the user to be optimal using the displayed feedback information. The display unit 180 includes a display, which may be composed of at least one light emitting diode (LED) or any other known type of display device. In an alternative embodiment, the display unit 180 may be replaced by or supplemented by any other known type of output device, such as audio or tactile output devices such as a speaker, a vibration generation device, etc., and any mode capable of displaying or outputting certain information to user may be used as a display unit 180 or an output device including or instead of the display unit 180. However, in the iris scanning mode, the user regulates the distance in the state where the user gazes at the camera 170, and thus the appropriate distance may be outputted using the sense of touch and the sense of hearing.

If the proximity sensing and iris sensing are performed by operation of each module and component described above, the controller 130 may analyze result data from such proximity and iris sensing, and perform a function in each mode of the proximity sensing mode and the iris sensing mode. That is, in the proximity sensing mode, if the proximity sensing unit 100, including the power supply unit 140, the light emitting unit 150 and the light receiving unit 160, senses whether the object has approached, the controller 130 performs a function according to the sensed information on whether the object has approached. For example, if the approach of the object is sensed by the proximity sensing unit 100, the controller 130 may deactivate the input unit 110 and the display unit 180; for example, a touch screen turns on when a face approaches towards the touch screen during a phone call, but turns off when the face moves away from the screen. If it is determined that the object has not approached the terminal according to the proximity sensing unit 100, the controller 130 may activate the input unit 110 and the display unit 180. Further, in the iris scanning mode, if the iris sensing unit 200, including the power supply unit 140, the light emitting unit 150, and the camera 170, photographs the iris and obtains the iris image, the controller 130 may recognize the iris through a process of comparing the obtained iris image with an iris image stored in advance in the storage unit 190.

As described above, according to the present invention, iris scanning is possible through the illumination used in the proximity sensing, and the infrared rays used in the proximity sensing are not visible unlike a general illuminator which uses visible light, and thus the user may gaze at the camera 170 without experiencing any glare. Further, if the proximity sensing is used in the iris scanning mode, the optimal distance for iris scanning may be found without checking a separate screen guide, and thus the camera 170 and the screen of the display unit 180 do not need to be separately checked by the user.

Hereinafter, the relationship between the power supplied to the light emitting unit 150 and the power collected in the light receiving unit 160 in the iris scanning mode and the proximity sensing mode according to the exemplary embodiment of the present invention will be described with reference to FIGS. 3 to 6.

Figure 3:
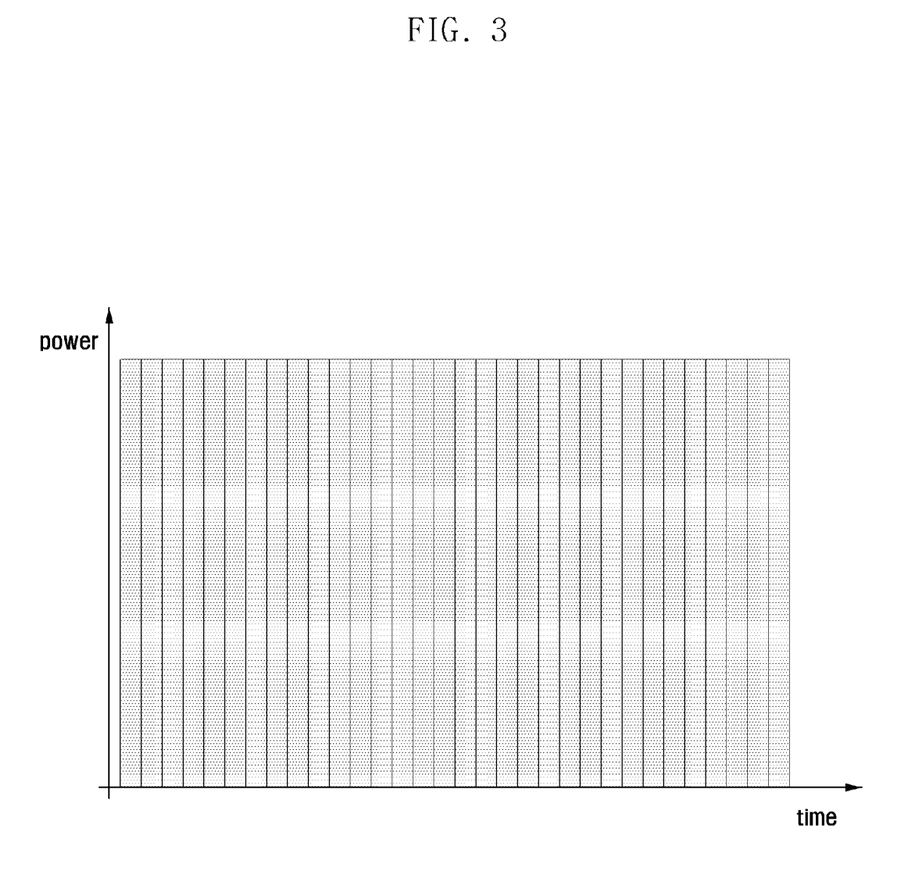
FIG. 3 illustrates power supplied to a light emitting unit of the terminal in an iris scanning mode according to the exemplary embodiment of the present invention.
Figure 4:
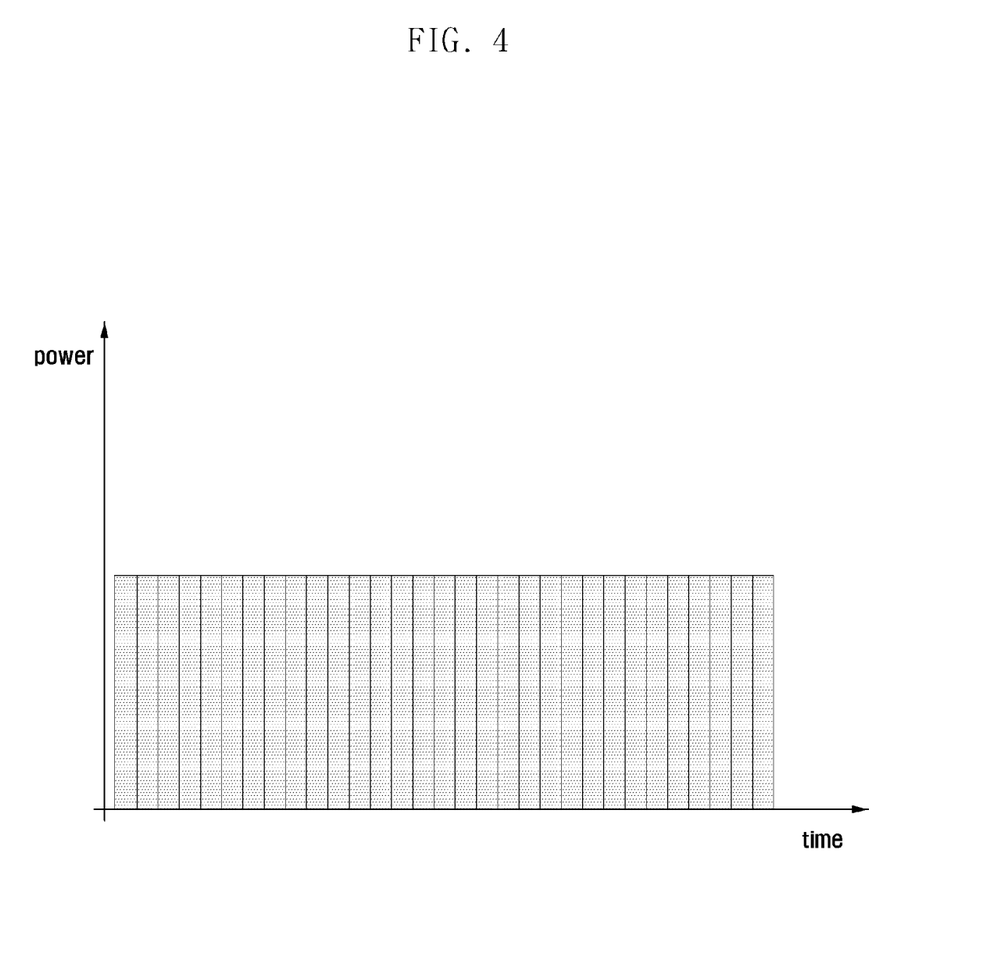
FIG. 4 illustrates power supplied to the light emitting unit of the terminal in a proximity sensing mode according to the exemplary embodiment of the present invention.
Figure 5:
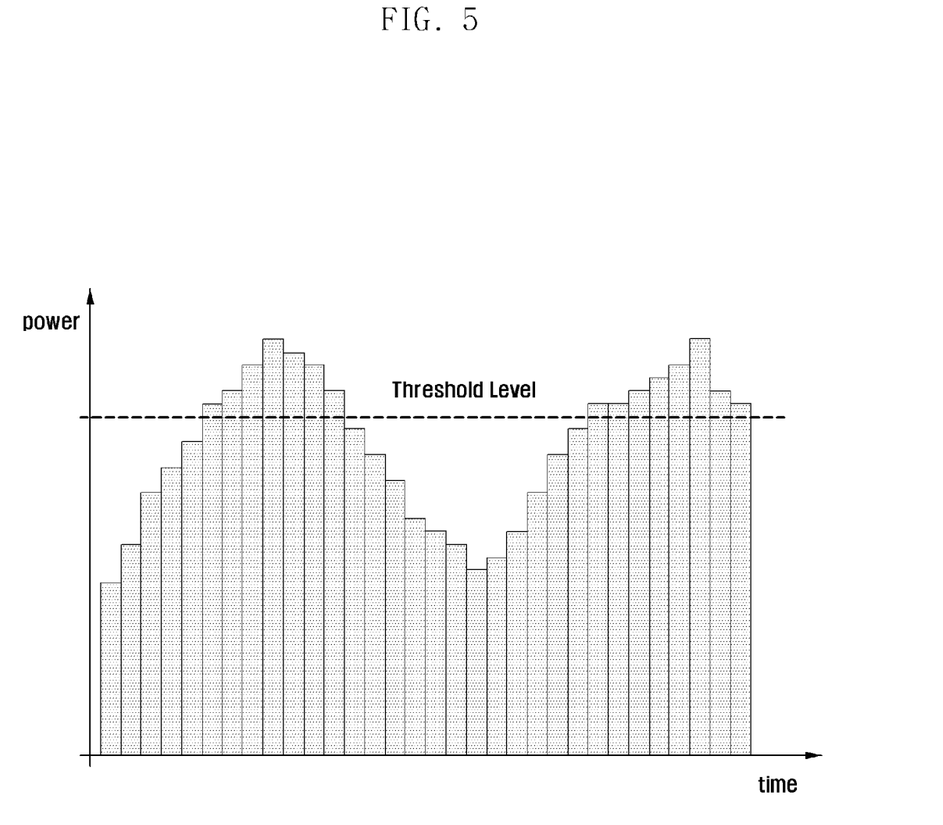
FIG. 5 illustrates the power of light collected in a light receiving unit of the terminal in the iris scanning mode according to the exemplary embodiment of the present invention.
Figure 6:
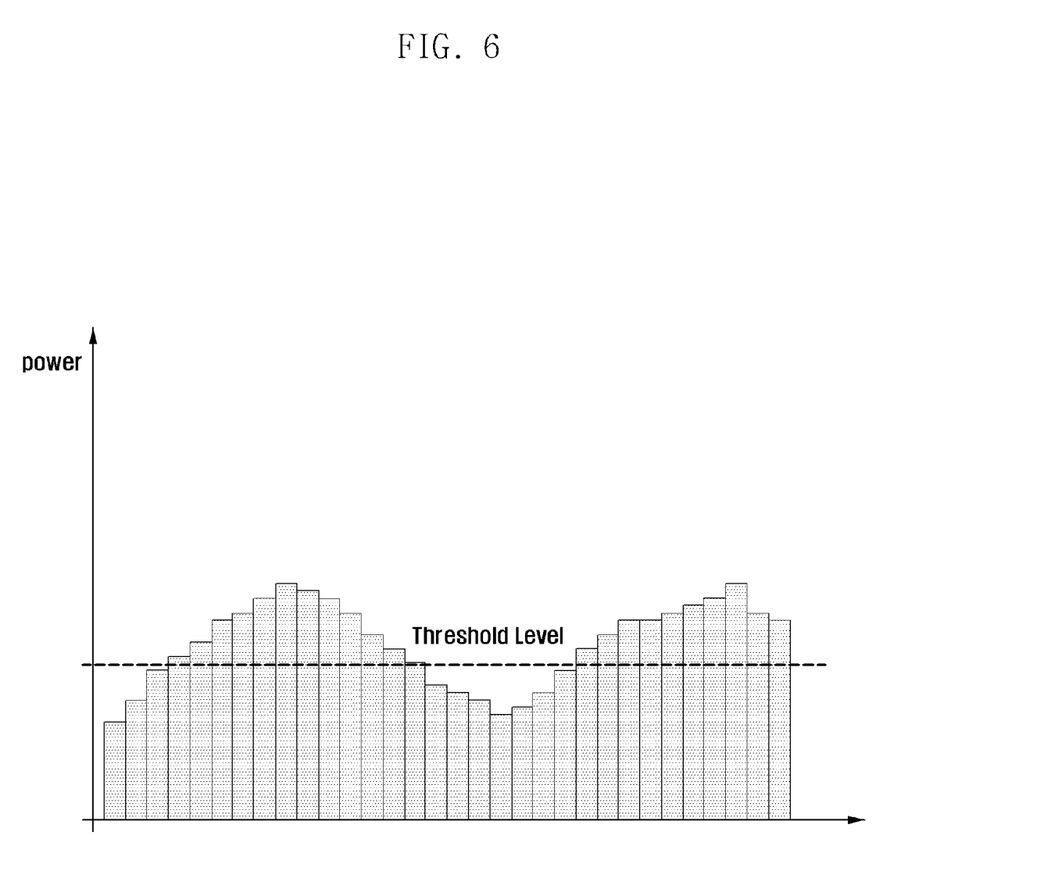
FIG. 6 illustrates the power of light collected in the light receiving unit of the terminal in the proximity sensing mode according to the exemplary embodiment of the present invention.

FIG. 3 illustrates power supplied to the light emitting unit 150 of the terminal in the iris scanning mode, and FIG. 4 illustrates power supplied to the light emitting unit 150 of the terminal in the proximity sensing mode, respectively, according to the exemplary embodiment of the present invention. FIG. 5 illustrates the power collected in the light receiving unit 160 of the terminal in the iris scanning mode, and FIG. 6 illustrates the power collected in the light receiving unit 160 in the proximity sensing mode, respectively, according to the exemplary embodiment of the present invention. As illustrated in FIGS. 3 and 4, the power supplied to the light emitting unit 150 in the iris scanning mode is higher than the power supplied to the light emitting mode 150 in the proximity sensing mode. Hence, the amount of light emitted in the iris scanning mode is higher than the amount of light emitted in the proximity sensing mode. As a result, the power of light collected in the light receiving unit 160 has a higher value in the iris scanning mode as shown in FIG. 5.

Referring to FIGS. 5 and 6, the power levels of the collected light may have a deviation depending on whether an object has approached, or the overall average value of the power levels of the collected light may be different in each mode. Hence, if the size of the light reception analysis level, as a threshold level, which is the criterion for determining whether an object approached, is set to be the same in both of the iris scanning and proximity sensing modes, it cannot be determined whether the object has approached. Hence, as described above, the controller 130 regulates the amount of light emitted according to the selection information corresponding to selecting either the iris scanning mode or the proximity sensing mode, and regulates the light reception analysis level according to the amount of emitted or collected light. Consequently, according to the present invention, even in the case in which the amount of collected light or the scale of the power levels of light becomes different, the light receiving unit 160 may determine whether the object has approached in a manner that fits each of the iris scanning mode and the proximity sensing mode.

Hereinafter, a method of iris scanning and proximity sensing according to the exemplary embodiment of the present invention will be described with reference to FIGS. 7 to 9.

Figure 7:
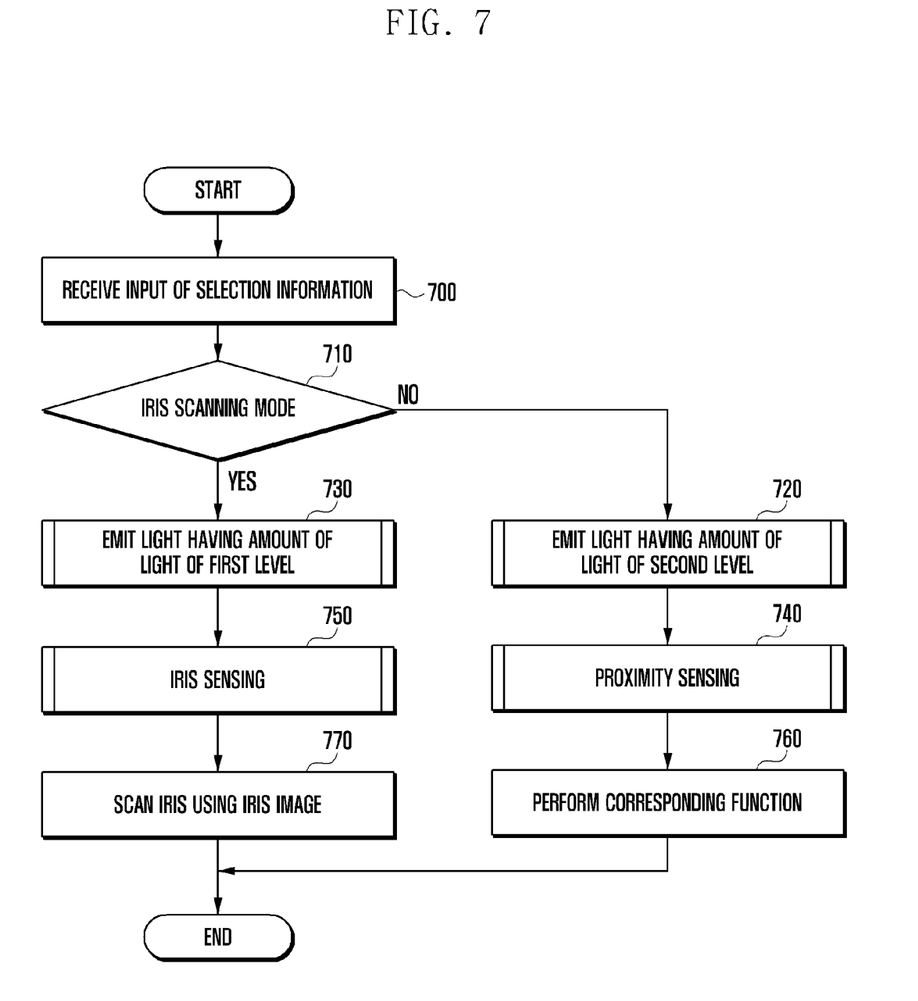
FIG. 7 is a flowchart illustrating a method of iris scanning and proximity sensing according to the exemplary embodiment of the present invention.

FIG. 7 is a flowchart illustrating the method of iris scanning and proximity sensing according to the exemplary embodiment of the present invention.

First, the input unit 110 receives selection information of the operation mode in step 700. The selection information for selecting the iris scanning mode or the proximity sensing mode may be inputted using a soft button of a touch pad or a keyboard, and may also be inputted by a voice, action or gesture, through the input unit 110. The controller 130 determines whether the selected operation mode is the iris scanning mode or the proximity sensing mode in step 710. If the selected operation mode is the iris scanning mode, the iris sensing unit 200 emits light having the amount of light of the first level in step 730, and senses the iris 750. Further, the iris is scanned in step 770 using the obtained iris image as a result of the sensing in step 750. The method then ends. However, referring back to step 710, as a result of determination at step 710, if the selected operation mode is the proximity sensing mode, the proximity sensing unit 100 emits light having the amount of light of the second level in step 720, and senses whether the object has approached in step 740. Further, a corresponding function is performed according to the result of the proximity sensing in step 760, and the method then ends. Here, the first level has a value higher than the second level. In an alternative embodiment, the light having the amount of light of the first level and the light having the amount of light of the second level may be light emitted by one module having the light emitting unit 150. In another alternative embodiment in the iris scanning mode, the power supply unit 140 may supply power corresponding to the amount of light of the first level to the light emitting unit 150 which emits light in step 730, and the iris lighted up by the light having the amount of light of the first level may be photographed in step 750.

Figure 8:
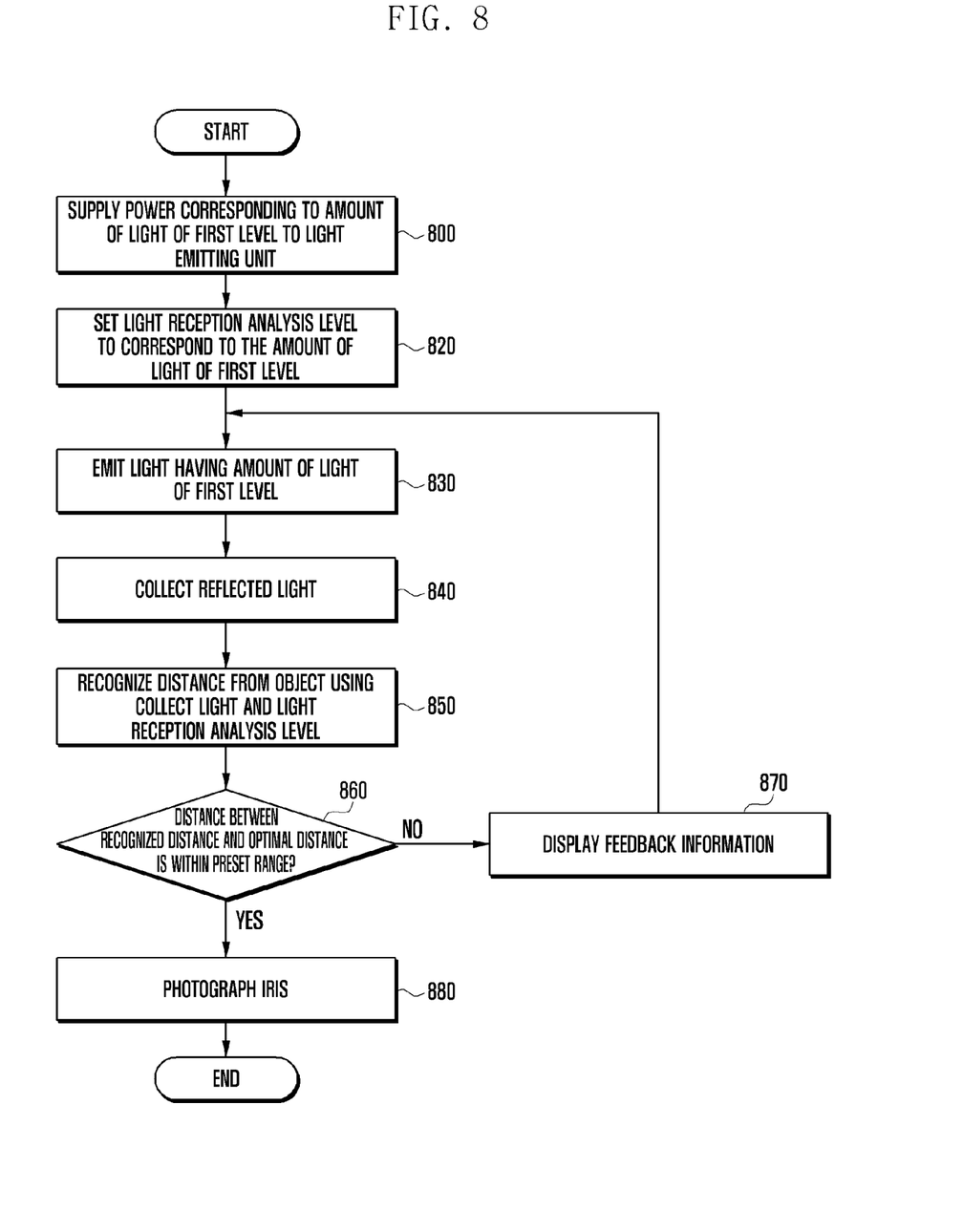
FIG. 8 is a flowchart illustrating in detail the method of iris scanning and proximity sensing in the iris scanning mode according to the exemplary embodiment of the present invention.

FIG. 8 is a flowchart illustrating in detail the method of iris scanning and proximity sensing in the iris scanning mode according to the exemplary embodiment of the present invention, and as specified steps 730 and 750 of FIG. 7.

Referring to FIG. 8, in the iris scanning mode, the power supply unit 140 supplies power, corresponding to the amount of light of the first level, to the light emitting unit 150 in step 800. Further, the controller 130 sets the light reception analysis level to correspond to the amount of light of the first level in step 820. The light emitting unit 150 emits light having the amount of light of the first level with the power supplied from the power supply unit 140 in step 830. If the emitted light reflects off an object, such as the user or the eye or iris of the user, the light receiving unit 160 collects the reflected light in step 840. Next, the light receiving unit 160 recognizes the distance between the terminal and the object using the collected light and the light reception analysis level in step 850. The controller 130 determines whether the difference between the recognized distance and the optimal distance is within the preset range in step 860. As a result, if the difference between the recognized distance and the optimal distance is within the preset range, the camera 170 photographs the iris lighted up by the light having the amount of light of the first level in step 880, and the method ends. However, as a result of the determination of the difference in step 860, if the difference between the recognized distance and the optimal distance is not within the preset range, the display unit 180 displays or otherwise outputs feedback information, such as a visual and/or audible message or an indication of the recognized and optimal distances, in step 870, so that a user may adjust the distance, and the method loops back to step 830 to perform iris scanning mode with the iris at the new adjusted distance. If the user regulates the distance between the user's iris and the terminal according to the displayed feedback information, the light emitting unit 150 re-emits the light at step 830 so that the distance between user and the terminal may be recognized. Through such a process, the terminal may scan the iris from the distance which is most optimal for iris scanning.

Figure 9:
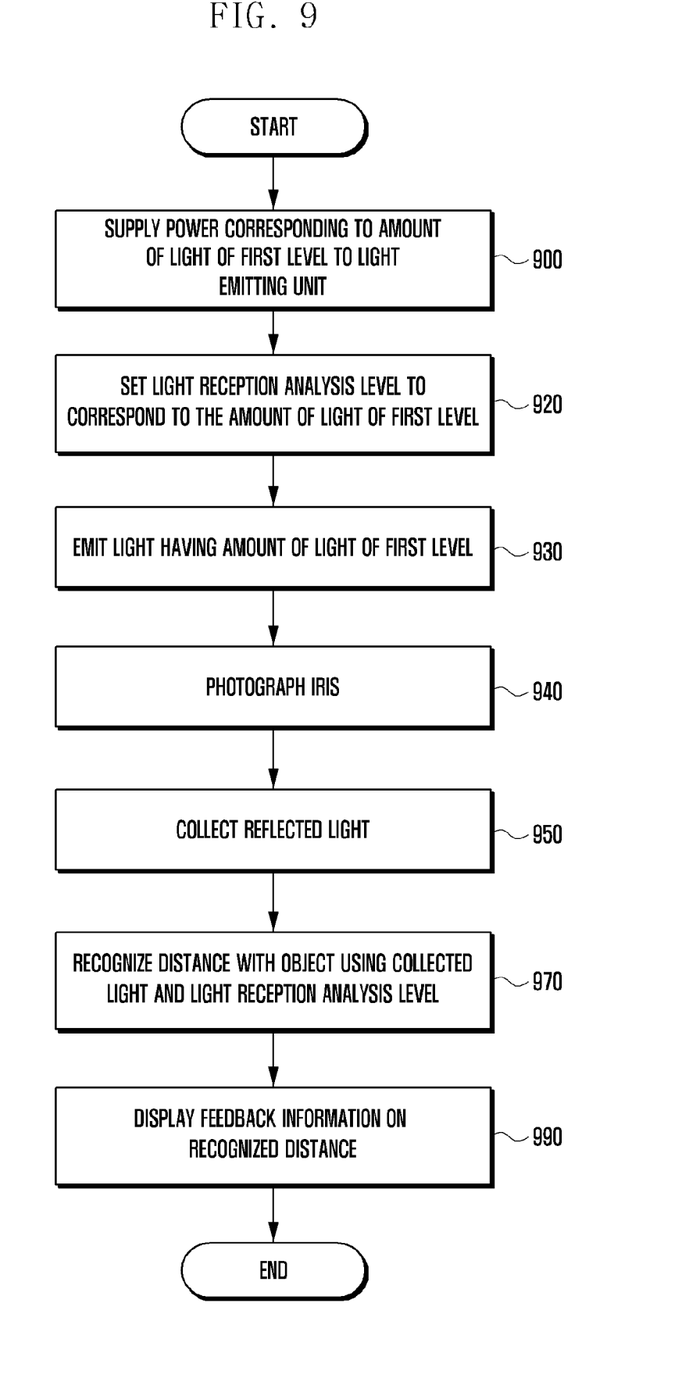
FIG. 9 is a flowchart illustrating in detail the method of iris scanning and proximity sensing in the iris scanning mode according to an alternative exemplary embodiment of the present invention.

FIG. 9 illustrates the method of iris scanning and proximity sensing in the iris scanning mode according to the alternative exemplary embodiment of the present invention.

Referring to FIG. 9, in the iris scanning mode, the power supply unit 140 supplies power corresponding to the amount of light of the first level to the light emitting unit in step 900. Further, the controller 130 sets the light reception analysis level to correspond to the amount of light of the first level in step 920. In the exemplary embodiment, the light reception analysis level may be set at step 920, but this operation may alternatively be performed any time before step 970 in which the light reception analysis level is used. The light emitting unit 150 emits light having the amount of light of the first level with the power supplied from the power supply unit 140 in step 930. The camera 170 photographs the iris lighted up by the emitted light in step 940. If the light is emitted, the photographing may be continually performed by the camera 170 and/or an iris scanning engine. After the iris is scanned, if the light reflects off the object, the light receiving unit 160 collects the reflected light in step 950, and recognizes the distance of the terminal from the object using the collected light and the light reception analysis level in step 970. In the exemplary embodiment illustrated in FIG. 9, steps 940 and 950 are sequentially performed, but the steps 940 and 950 may alternatively be performed at the same time. After step 970, the display unit 180 displays or otherwise outputs visual and/or audible feedback information of the recognized distance in step 990, and the method ends. That is, the terminal may provide simple feedback information on the recognized distance while simultaneously performing iris photographing and proximity sensing. The feedback information may include, for example, direction information on the distance between the object and the terminal, information on whether user should move closer or further, etc. According to the exemplary embodiment, the user may manually photograph the iris from the optimal distance using the feedback information.

Figure 10:
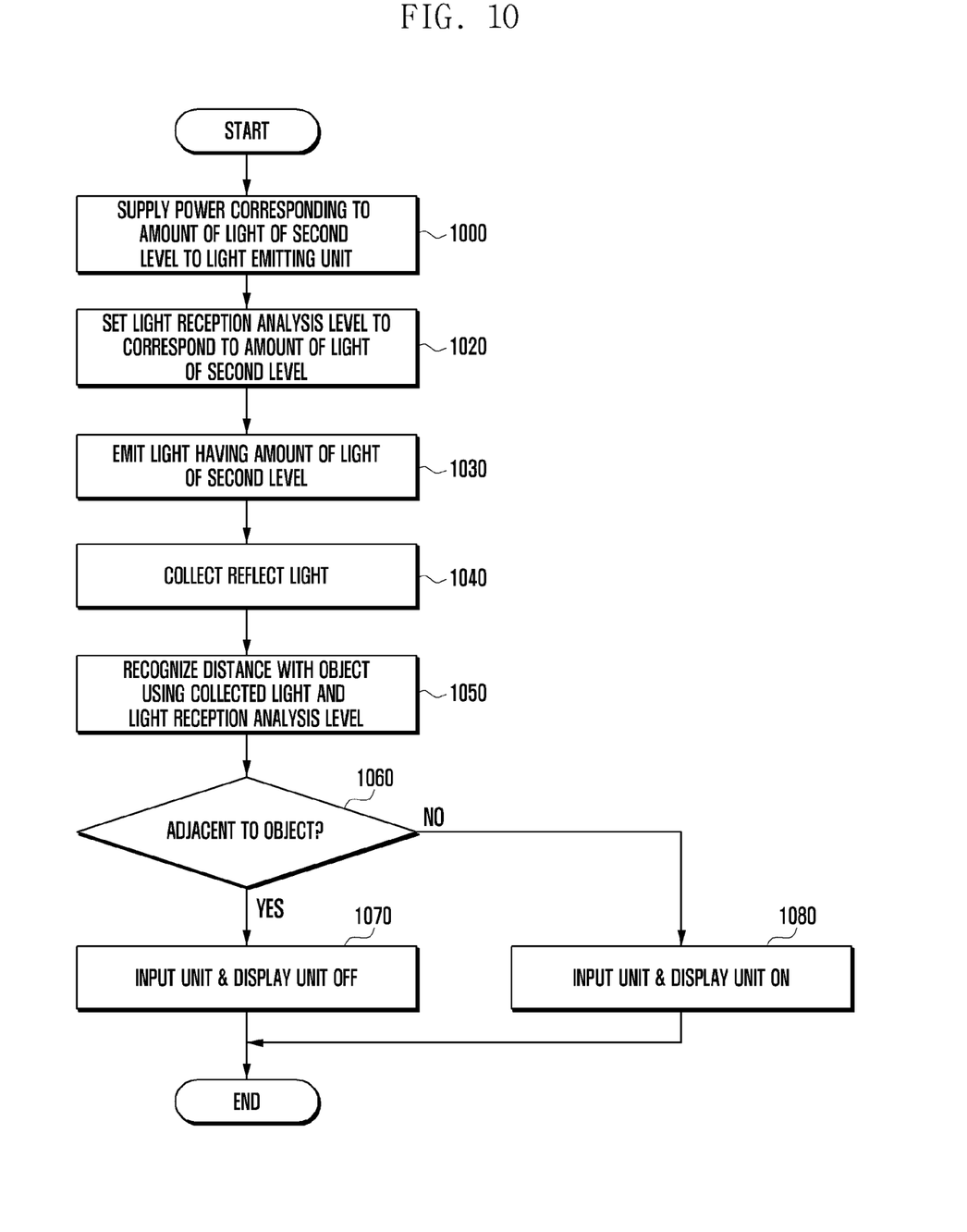
FIG. 10 is a flowchart illustrating in detail a method of proximity sensing in the proximity sensing mode according to the exemplary embodiment of the present invention.

FIG. 10 is a flowchart illustrating in detail the method of proximity sensing in the proximity sensing mode according to the exemplary embodiment of the present invention, and as specified in steps 720 and 740 of FIG. 7.

Referring to FIG. 10, in the proximity sensing mode, the power supply unit 140 supplies power corresponding to the amount of light of the second level to the light emitting unit 150 in step 1000. The controller 130 sets the light reception analysis level to correspond to the amount of light of the first level in step 1020. The light emitting unit 150 emits light having the amount of light of the second level with the power supplied from the power supply unit 140 in step 1030. If the emitted light reflects off the object, the light receiving unit 160 collects the reflected light in step 1040. Next, the light receiving unit 160 and/or the controller 130 recognizes and/or measures the distance from the object using the collected light and the light reception analysis level in step 1050. The controller 130 determines whether the terminal is adjacent to the object in step 1060. As a result of the determination in step 1060, if it is determined that the object has approached the terminal, the controller 130 may deactivate the input unit 110 and the display unit 180 in step 1070, in order to reduce power consumption to provide more power for the iris scanning mode, and the method ends. However, as a result of the determination in step 1060, if it is determined that the object has not approached the terminal, the terminal may activate the input unit 110 and the display unit 180 in step 1080.

According to the present invention, the iris scanning rate may be increased using a proximity sensor built in a terminal without adding a separate infrared ray illuminator in the terminal.

Further, according to the present invention, a terminal may provide an infrared ray or visible light illuminator needed for iris scanning, and, at the same time, may perform proximity sensing.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of iris scanning and proximity sensing in a terminal, the method comprising:
   determining a selected operation mode is iris scanning mode or proximity sensing mode at an input unit;
   when the selected operation mode is an iris scanning mode, performing the operation of sensing the iris, the operation of sensing the iris comprising emitting a first light having an amount of light of a first level, and photographing an iris using the first light;
   when the selected operation mode is a proximity sensing mode, performing the operation of sensing proximity degree, the operation of sensing the proximity degree comprising emitting a second light having an amount of light of a second level, and sensing proximity information on whether an object has approached using the second light;
   recognizing the iris, by a controller, using the photographed iris image and performing a function according to the sensed proximity information, and
   wherein the first level is higher than the second level.

2. The method of claim 1, wherein the first and second level are emitted from one module.

3. The method of claim 1, wherein the operation of sensing the iris further comprises:
   supplying power corresponding to the amount of light of the first level to a light emitting unit which emits light;
   emitting the light having the amount of light of the first level; and
   photographing the iris lighted up by the emitted light.

4. The method of claim 3, wherein, when the selected operation mode is the proximity sensing mode, further comprising:
   setting a light reception analysis level to correspond to the amount of light of the first level;
   collecting reflected light if the emitted light reflects off the object;
   recognizing a distance between the terminal and the object using the collected light and the light reception analysis level;
   comparing the recognized distance with an optimal distance for iris scanning; and
   outputting feedback information according to a result of the comparison.

5. The method of claim 4, wherein the photographing of the iris comprises:
   automatically photographing the iris lighted up by the emitted light if the difference between the recognized distance and the optimal distance is within a preset range as a result of the comparison.

6. The method of claim 1, wherein the operation of sensing the proximity degree further comprises:
   supplying power corresponding to the amount of the second level to a light emitting unit which emits light;
   setting a light reception analysis level to correspond to the amount of light of the second level;
   emitting the light having the amount of light of the second level;
   collecting reflected light if the emitted light reflects off the object; and
   recognizing a distance of the terminal from the object using the collected light and the light reception analysis level.

7. A terminal for iris scanning and proximity sensing, the terminal comprising:
   an input unit for receiving selection information of an operation mode;
   an iris sensing unit for emitting a first light having an amount of light of a first level, and photographing an iris using the emitted first light when the selected operation mode is a iris scanning mode;
   a proximity sensing unit for emitting a second light having an amount of light of a second level, and sensing information on whether an object has approached the terminal using the emitted second light when the selected operation mode is a proximity sensing mode; and a controller for recognizing the iris using the photographed iris image, and performing a function according to the sensed information on whether the object has approached the terminal, wherein the first level is higher than the second level.

8. The terminal of claim 7, wherein the first and second light are emitted from one module.

9. The terminal of claim 7, wherein the iris sensing unit comprises:
- a power supply unit for supplying power corresponding to the amount of light of the first level;
- a light emitting unit for receiving the supplied power and emitting the light having the amount of light of the first level; and
- a camera for photographing the iris lighted up by the emitted light.

10. The terminal of claim 9, wherein, in the iris scanning mode, the controller sets a light reception analysis level to correspond to the amount of light of the first level, and the terminal further comprises:
- a light receiving unit for collecting reflected light if the emitted light reflects off the object, and recognizing a distance between the terminal and the object using the collected light and the light reception analysis level, wherein the controller compares the recognized distance with an optimal distance for iris scanning; and
- an output unit for outputting feedback information according to a result of the comparison.

11. The terminal of claim 10, wherein the camera automatically photographs the iris lighted up by the emitted light if the difference between the recognized distance and the optimal distance is within a preset range as a result of the comparison.

12. The terminal of claim 7, wherein, in the proximity sensing mode, the controller sets a light reception analysis level to correspond to the amount of light of the second level, wherein the proximity sensing unit comprises:
- a power supply unit for supplying power corresponding to the amount of the second level;
- a light emitting unit for receiving the supplied power and emitting the light having the amount of light of the second level; and
- a light receiving unit for collecting reflected light if the emitted light reflects off the object, and recognizing a distance of the terminal from the object using the collected light and the light reception analysis level.

* * * * *